US012254594B2

United States Patent
Qu et al.

(10) Patent No.: US 12,254,594 B2
(45) Date of Patent: Mar. 18, 2025

(54) ENHANCING DETAILED SEGMENTS IN LATENT CODE-BASED EDITED DIGITAL IMAGES

(71) Applicant: Adobe Inc., San Jose, CA (US)

(72) Inventors: Hui Qu, Santa Clara, CA (US); Jingwan Lu, Santa Clara, CA (US); Saeid Motiian, San Francisco, CA (US); Shabnam Ghadar, Menlo Park, CA (US); Wei-An Lin, San Jose, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 386 days.

(21) Appl. No.: 17/657,691

(22) Filed: Apr. 1, 2022

(65) Prior Publication Data

US 2023/0316474 A1 Oct. 5, 2023

(51) Int. Cl.
*G06T 5/50* (2006.01)
*G06N 3/04* (2023.01)
*G06N 3/045* (2023.01)
*G06T 7/11* (2017.01)

(52) U.S. Cl.
CPC .............. *G06T 5/50* (2013.01); *G06N 3/045* (2023.01); *G06T 7/11* (2017.01); *G06T 2207/20084* (2013.01); *G06T 2207/20172* (2013.01)

(58) Field of Classification Search
CPC ... G06T 5/50; G06T 7/11; G06T 2207/20084; G06T 2207/20172; G06T 11/60; G06N 3/045; G06N 3/0475; G06N 3/088
See application file for complete search history.

(56) References Cited

U.S. PATENT DOCUMENTS

| | | | | |
|---|---|---|---|---|
| 2020/0151860 | A1* | 5/2020 | Safdarnejad | G06T 7/162 |
| 2020/0202533 | A1* | 6/2020 | Cohen | G06T 7/194 |
| 2020/0349393 | A1* | 11/2020 | Zhong | G06N 3/084 |
| 2021/0279887 | A1* | 9/2021 | Ma | G06T 7/12 |
| 2022/0028149 | A1* | 1/2022 | Prasad | G06T 15/205 |
| 2023/0154089 | A1* | 5/2023 | Bradley | G06N 3/088 |
| | | | | 345/474 |

OTHER PUBLICATIONS

Omer Tov, Yuval Alaluf, Yotam Nitzan, Or Patashnik, and Daniel Cohen-Or. Designing an encoder for stylegan image manipulation. arXiv preprint arXiv:2102.02766, 2021.

(Continued)

*Primary Examiner* — Iriana Cruz
(74) *Attorney, Agent, or Firm* — Keller Preece PLLC

(57) ABSTRACT

Methods, systems, and non-transitory computer readable media are disclosed for intelligently enhancing details in edited images. The disclosed system iteratively updates residual detail latent code for segments in edited images where detail has been lost through the editing process. More particularly, the disclosed system enhances an edited segment in an edited image based on details in a detailed segment of an image. Additionally, the disclosed system may utilize a detail neural network encoder to project the detailed segment and a corresponding segment of the edited image into a residual detail latent code. In some embodiments, the disclosed system generates a refined edited image based on the residual detail latent code and a latent vector of the edited image.

20 Claims, 9 Drawing Sheets

(56) References Cited

OTHER PUBLICATIONS

Daniel Roich, Ron mokady, Amit H. Bermano, and Daniel cohen-Or. Pivotal Tuning for Latent-based Editing of Real Images. arXiv preprint arXiv:2106.05744, 2021.
Peihao Zhu, Rameen Abdal, John Femiani, and Peter Wonka. Barbershop: GAN-based image Composting using Segmentation Masks. arXiv preprint arXiv:2106.05744, 2021.
Yuval Alaluf, Or Patashnik, and Daniel Cohen-Or. Restyle: A residual-based stylegan encoder via iterative refinement. arXiv preprint arXiv:2104,-2699, 2021.
Justin Johnson, Alexandre Alahi, and Li Fei-Fei. Perceputal losses for real-time style transfer and super-resolution. European conference on computer vision, 2016.

\* cited by examiner ant text in the art with systems, methods, and
ENHANCING DETAILED SEGMENTS IN LATENT CODE-BASED EDITED DIGITAL IMAGES

BACKGROUND

In recent years, conventional image generating systems have increasingly implemented neural networks to perform computer image tasks. For instance, many conventional systems use generative neural networks, such as generative adversarial networks (GANs) to generate or modify digital images. In one such approach, conventional image generating systems project real data points of an image onto a latent vector that is subsequently utilized by a GAN to reconstruct or modify the image. Some such conventional systems are able to produce realistic modified images by implementing edits in the latent space. Despite recent advancements in editing digital images within latent spaces, however, conventional methods lose details in high frequency areas, require large amounts of time, have high computational costs, and often introduce unwanted visual artifacts within the generated images. Accordingly, many conventional image generating systems that utilize neural networks to modify digital images have a number of shortcomings with regard to accuracy, efficiency, and flexibility.

SUMMARY

One or more embodiments provide benefits and/or solve one or more problems in the art with systems, methods, and non-transitory computer readable storage media that enhance details in latent space edited images by iteratively updating a latent code for a detailed area in an edited or reconstructed image. In one or more embodiments, the disclosed system utilizes an encoder to iteratively update a residual detail latent code for the detailed area. The disclosed system then adds the updated residual detail latent code for the detailed area to the edited latent code to improve the details of the detailed area in resulting reconstructed digital image. For example, the disclosed system improves details in hair, wrinkles, or other high frequency image areas.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
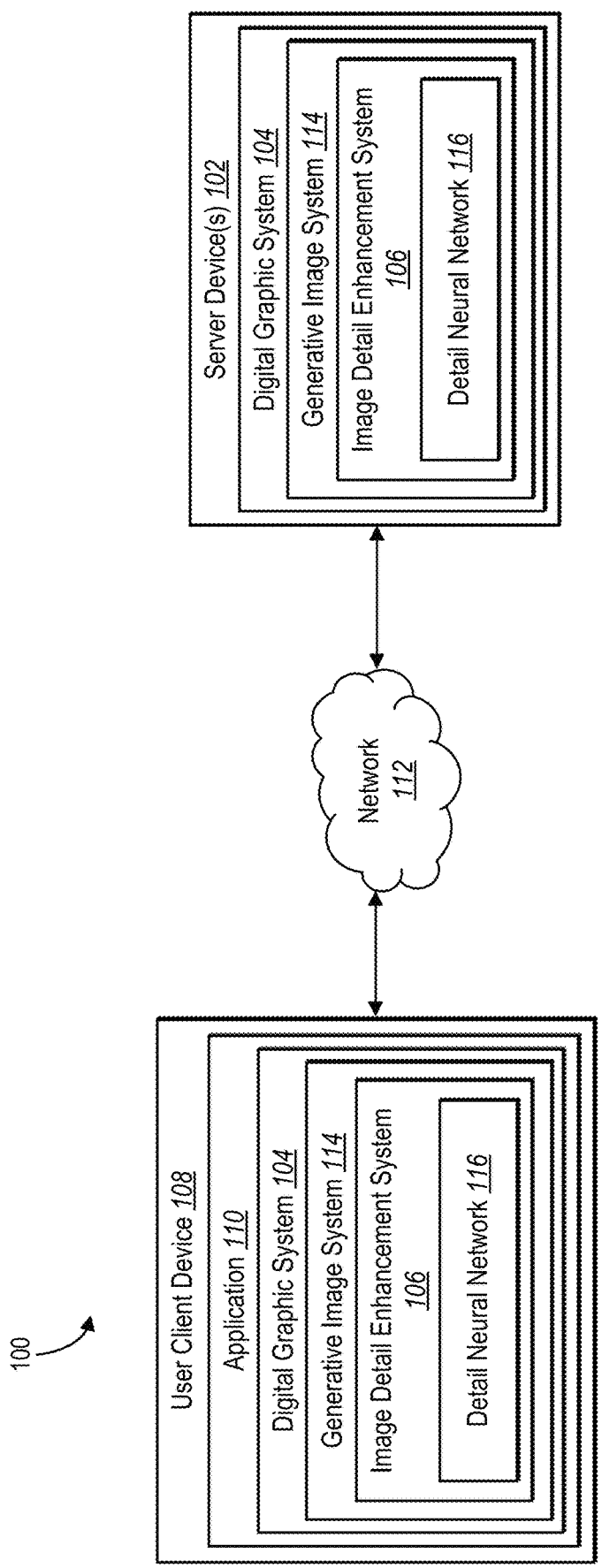
FIG. 1 illustrates an environment in which an image detail enhancement system operates in accordance with one or more embodiments of the present disclosure.

One or more embodiments of the present disclosure includes an image detail enhancement system that utilizes deep learning to enhance details in a reconstructed or edited image. In particular, latent-based editing modifies the latent code of an image to generate a reconstructed or modified image utilizing a generative adversarial network. Often latent-based editing of an image results in lost details in high frequency areas. To help ensure that details are not lost in the reconstructed image, the image detail enhancement system iteratively updates, utilizing a neural network encoder, a residual detail latent code for a portion of the image including details, such as wrinkles or hair. The image detail enhancement system then adds the updated residual detail latent code to the latent code of the edited image. The updated residual detail latent code for the detailed portion of the image helps ensure that a resulting image generated by a generative adversarial network includes enhanced details.

In some embodiments, the image detail enhancement system generates an edited image from an image. Generally, the image detail enhancement system utilizes a neural network to project the image into a latent space. The image detail enhancement system modifies the latent code to generate an edited latent code. The image detail enhancement system then decodes the edited latent code utilizing a neural network generator to generate an edited image. In one example, the image detail enhancement system modifies the latent code of an image to edit a face of the image to portray the face at a different angle or performs another type of edit. As explained in greater detail below, the edited image may have a loss of details in high frequency areas (e.g., hair, beard, wrinkled skin).

The image detail enhancement system enhances the high frequency areas of the edited image to recapture details from the image. More specifically, the image detail enhancement system segments a portion of the image to be enhanced (the hair) from the image. Similarly, image detail enhancement system segments the portion of the edited image to be enhanced (the hair) from the edited image. In one or more embodiments, the image detail enhancement system projects the segments from the image and the edit image into a residual detail latent code utilizing a detail neural network encoder. In particular, the image detail enhancement system utilizes a detail neural network encoder to generate a residual detail latent code that contains information for the high frequency segment (e.g., hair details).

Furthermore, in some embodiments, the image detail enhancement system utilizes a generative adversarial neural network to generate a refined edited image with an increased level of detail in the high frequency segment (e.g., the hair) relative to the edited image. For example, the image detail enhancement system combines the residual detail latent code and the latent code of the edited image. The image detail enhancement system then generates the refined edited image by synthesizing the combination of the residual detail latent code and the latent code of the edited image utilizing a generator of the generative adversarial neural network.

In some embodiments, the image detail enhancement system enhances details in the refined edited image by iteratively updating the residual detail latent code. Generally, the image detail enhancement system gradually improves the quality of the refined edited image by iteratively adding details to the high frequency area. For example, the image detail enhancement system adds details to the refined edited segment by iteratively refining the residual detail latent code.

The image detail enhancement system provides several technical benefits relative to conventional systems. Specifically, conventional systems often generate edited images that suffer losses in detail when compared to original images. In particular, some conventional systems utilize generative adversarial networks (GANs) to produce latent codes with high edibility. However, conventional systems often create reconstructed or edited images in which details are lost. For example, edited images portraying faces with new angles or modified hair volumes often suffer from a loss of high frequency details of hair when compared with original images.

Conventional systems typically rely on inefficient and computationally expensive methods to mitigate the disappearance of details in edited images. For instance, some conventional systems finetune GAN generators to improve the details in reconstructed and edited images. This method of finetuning a GAN generator is computationally expensive because conventional systems must finetune the generator for each new image. Furthermore, conventional systems must often utilize excessive storage resources to store finetuned weights for each image. In sum, the computational load required by such conventional systems is often prohibitive for utilization in commercial products.

Furthermore, the computing resources required for conventional image processing systems often results in excessive processing times. To illustrate, finetuning a GAN generator for a single image often takes around two minutes for optimization, which is too slow for practical applications. Furthermore, other conventional systems may transfer details between images, for example by projecting images into different latent spaces. However, such conventional systems rely on additional steps that include alignment and blending techniques. These additional steps slow overall processing time and make real-time or near-real time processing difficult or impossible.

As mentioned, the image detail enhancement system provides numerous advantages, benefits, and practical applications over conventional systems. In particular, the image detail enhancement system improves accuracy relative to conventional systems. The image detail enhancement system utilizes details from a detailed segment in an image to enhance details in a corresponding edited segment in an edited image. Furthermore, the image detail enhancement system utilizes an iterative approach to updating a residual detail latent code to improve details in an enhanced edited image. The image detail enhancement system improves details in refined edited segments with each iteration.

The image detail enhancement system makes improvements to efficiency relative to conventional systems. In contrast to conventional systems that store finetuned weights of a generator for each image, the image detail enhancement system needs only store a single detail neural network encoder and a generative adversarial neural network. Furthermore, by utilizing an encoder-based method, the image detail enhancement system reduces computational cost compared to optimization, blending, or alignment methods in conventional systems. Accordingly, the image detail enhancement system utilizes fewer storage computational resources.

Furthermore, the image detail enhancement system improves the quality of images in real or near-real time. More specifically, the image detail enhancement system trains a detail neural network encoder and applies the detail neural network encoder across images. In some embodiments, the image detail enhancement system utilizes the trained detail neural network encoder to provide a near real-time user experience to improve the visual quality of edited images. For example, the image detail enhancement system utilizes a method that takes 0.3 seconds in contrast to conventional systems that require minutes for optimization.

As illustrated by the foregoing discussion, the present disclosure utilizes a variety of terms to describe features and advantages of the disclosed method. Additional detail is now provided regarding the meaning of such terms. As used herein, the term "image" (sometimes referred to as "digital image") refers to a digital symbol, picture, icon, and/or other visual illustration depicting one or more objects. For instance, an image includes a digital file having a visual illustration and/or depiction of a person with a hairstyle (e.g., a portrait image) or wrinkles. Indeed, in some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

As used herein, term "neural network" refers to a machine learning model that can be tuned (e.g., trained) based on inputs to approximate unknown functions. In particular, a neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network), a generative adversarial neural network (GAN), or another multi-layer neural network. In some embodiments, a neural network includes a combination of neural networks or neural network components.

Relatedly, the term "generative neural network" refers to a neural network that generates digital content. In some cases, the generative neural network includes a neural network that generates digital images from one or more input features (e.g., an input digital image or noise). For example, a generative neural network includes a neural network that reconstructs target digital images from learned latent vectors. In one or more of the disclosed embodiments, the generative neural network includes a generative adversarial neural network (GAN), such as StyleGAN as described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety. Another example of a GAN includes a StyleGAN2 as described by T. Karras et al. in *Analyzing and improving the image quality of stylegan*. Proceedings of the IEEE/CVF conference on computer vision and pattern recognition, 2020, the content of which is hereby incorporated by reference in its entirety.

As used herein, the term "detail neural network encoder" refers to a computer-implemented neural network that projects digital images (or portions thereof) into a latent space. In particular, a detail neural network encoder projects image segments into latent vectors. In one example, a detail neural network encoder comprises a modified ReStyle encoder that projects detailed and edited segments into a residual detail latent code in the W+ space. More particularly, in some embodiments, the image detail enhancement system 106 utilizes a modified version of the ReStyle Encoder as described by Y. Alaluf, et al. in *Restyle: A residual-based stylegan encoder via iterative refinement*. arXiv preprint arXiv:2104.02699, 2021, the content of which is hereby incorporated by reference in its entirety.

As used herein, the term "edited image" or "latent-code based edited image" refers to a digital image that has been reconstructed or edited. In particular, latent-code based edited image are produced by projecting an image into a latent space, editing the latent code, and reconstructing an edited image from the edited latent code. Latent-code based edits applied to images to create edited images include adjusting the pose, hair style or hair volume, makeup, smile, age etc. of a person or other edits of non-portrait style images.

As used herein, the term "detailed segment" refers to a portion of an image comprising details. In particular, a detailed segment refers to a portion of an image that includes high-frequency details. For example, a detailed segment comprises pixels corresponding to hair in an image portraying a face. In another example, a detailed segment comprises wrinkles in an image portraying a face.

Relatedly, the term "edited segment" refers to a portion of a latent-code based edited image comprising details. In particular, an edited segment corresponds to a portion of an edited image corresponding to a detailed segment from an image from which the edited image is generated. For example, an edited segment may comprise pixels corresponding to hair in an edited image portraying a face.

Moreover, as used herein, the term "latent vector" or "latent code" or "latent representation" refers to a digital data embedding of latent (or hidden) features of a neural network. For example, a latent vector includes a vector reflecting features of a digital image that are indecipherable (to a human) but, when processed by layers of a generative neural network, generate a digital image. Relatedly, the term "latent space" refers to a multi-dimensional space containing latent values (e.g., latent vectors) that cannot be interpreted directly but which encode a meaningful internal representation of externally observable features (e.g., features of a digital image). In one or more embodiments, a latent vector comprises a multi-dimensional dataset that represents attributes and/or characteristics of visual features related to an image, video, and/or video frame. In the context of an image, a latent vector includes data representing characteristics (or features) of pixels of the image in some embodiments. For example, the image detail enhancement system extracts features from an image utilizing one or more layers of a neural network. The latent features can be latent or can be custom features that the neural network is trained to identify, such as, hair details and wrinkle details. Other details may include facial height, width, shape, hair/no hair, and skin tone, as well as the location of a user's facial features (e.g., eyes, noise, and mouth) relative to the entire face, hair length, facial feature angles (e.g., chin angle), facial feature lengths (e.g., mouth, nose, eyes), distances between facial features (e.g., distance between eyes), facial feature curvatures/shapes, or pixel intensities. As used herein, the term "residual detail latent code" refers to a latent vector that represents attributes and/or characteristics of visual features of a combination of a detail segment and an edited segment.

As used herein, the term "refined edited image" refers to an edited image that has undergone refinement by the image detail enhancement system. In particular, a refined edited image portrays the same subject as in an edited image but with greater detail. For example, a refined edited image depict a face at a different angle or with a different hair volume than the face in an image. However, in contrast to the edited image, a refined edited image comprises an increased level of detail. As used herein, the term "refined edited segment" refers to pixels in a refined edited image corresponding to high-frequency details. In particular, a refined edited segment corresponds to a detailed segment in an image.

The following disclosure provides additional detail regarding the image detail enhancement system in relation to illustrative figures portraying example embodiments and implementations of the image detail enhancement system. For example, FIG. 1 illustrates a schematic diagram of a system environment (or "environment") 100 in which an image detail enhancement system 106 operates in accordance with one or more embodiments. As illustrated, the environment 100 includes one or more server device(s) 102, connected to a user client device 108 via a network 112. While FIG. 1 shows an embodiment of the image detail enhancement system 106, alternative embodiments and configurations are possible.

As shown in FIG. 1, the server device(s) 102 and the user client device 108 are connected via the network 112. As shown, in one or more implementations, each of the components of the environment 100 communicate via the network 112. The network 112 comprises a suitable network over which computing devices can communicate. Example networks are discussed in additional detail below in relation to FIG. 9.

The environment 100 includes the server device(s) 102. The server device(s) 102 generates, stores, receives, and/or transmits digital information including digital images, edited images, metadata, etc. In particular, in one or more implementations, the server device(s) 102 provides digital information via web pages or native application to devices such as the user client device 108. The server device(s) 102 communicates with the user client device 108 via the network 112. For example, the server device(s) 102 gathers and/or receives digital information including images and edited images from the user client device 108. The server device(s) 102 may also present enhanced edited images at the user client device 108. In some embodiments, the server device(s) 102 comprise a distributed server where the server device(s) 102 include a number of server devices distributed across the network 112 and located in different physical locations. The server device(s) 102 optionally comprises a content server, an application server, a communication server, a web-hosting server, or a digital content management server.

As shown in FIG. 1, the server device(s) 102 includes a digital graphic system 104 which further includes a generative image system 114. Generally, the digital graphic system 104 generates, stores, receives, and/or transmits digital information for editing or reconstructing images. The digital graphic system 104 also performs various backend functions associated with the generation of refined edited images.

As further shown in FIG. 1, the server device(s) 102 includes a generative image system 114. More specifically, the generative image system 114 utilizes generative adversarial networks to generate and edit images. In particular, the generative image system 114 manages and stores generative adversarial networks that perform editing processes including projecting images into a latent space and performing latent-based editing to change the latent code and generate new images.

As further illustrated in FIG. 1, the environment includes the image detail enhancement system 106. The image detail enhancement system 106 generates refined edited images by utilizing a detail neural network encoder and a generative adversarial neural network. In particular, the image detail enhancement system 106 utilizes details from a detailed segment from an image to enhance details in an edited segment of an edited image. Furthermore, in one or more embodiments, the image detail enhancement system 106 provides a refined edited image for display on a graphical user interface of the user client device 108 (e.g., via an application 110).

The image detail enhancement system 106 illustrated in FIG. 1 stores and utilizes a detail neural network 116. In some embodiments, the image detail enhancement system 106 modifies parameters of the detail neural network 116. Additionally, the image detail enhancement system 106 applies the detail neural network 116. The detail neural network 116 comprises various components. For example, the detail neural network 116 may comprise a detail neural network encoder for projecting detailed and edited segments into residual detail latent codes.

As illustrated in FIG. 1, the environment 100 includes the user client device 108. The user client device 108 may generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 is a mobile device such as a laptop, tablet, mobile telephone, smartphone, etc. In other embodiments, the user client device 108 includes non-mobile devices, such as desktops or servers, or other types of client devices. Additional details regarding the computing devices, of which the user client device 108 is one implementation, are discussed below with respect to FIG. 9.

The user client device 108 is optionally associated with a user or user account of a data platform managed by the digital graphic system 104. For instance, the user client device 108 is associated with a creator or editor of an image. As mentioned, the user client device 108 communicates with the server device(s) 102. In particular, the user client device 108 uploads and sends digital data including images and user edits to the server device(s) 102 via the network 112. Additionally, the user client device 108 displays graphical user interfaces including refined edited images to a user associated with the user client device 108.

As illustrated in FIG. 1, the user client device 108 includes the application 110. The application 110 may be a web application or a native application on the user client device 108 (e.g., a mobile application, a desktop application, etc.). The application 110 interfaces with the digital graphic system 104 to provide digital content including images, edited images, and refined edited images to the device(s) 102. In one or more implementations, the application 110 is a browser that renders a graphical user interface on the display of the user client device 108. For example, the application 110 renders graphical user interfaces for receiving user edits and images. Additionally, the application 110 optionally presents refined edited images for display via the user client device 108.

In some embodiments, the digital graphic system 104, the generative image system 114, and the image detail enhancement system 106 are located on the server device(s) 102 and/or the user client device 108. In some embodiments, the digital graphic system 104, the generative image system 114, and the image detail enhancement system 106 are implemented by (e.g., located entirely or in part) on one or more other components of the environment 100. For example, the digital graphic system 104, the generative image system 114, and the image detail enhancement system 106 may be implemented entirely (or in part) on the user client device 108.

To illustrate, in some implementations, the image detail enhancement system 106 on the server device(s) 102 supports the image detail enhancement system 106 on the user client device 108. For instance, the image detail enhancement system 106 on the server device(s) 102 generates or trains the detail neural network 116 and provides the trained detail neural network 116 to the user client device 108. More specifically, the image detail enhancement system 106 provides the trained detail neural network 116 for utilization by the image detail enhancement system 106 of the user client device 108. In other words, the user client device 108 obtains (e.g., downloads) the image detail enhancement system 106 from the server device(s) 102. At this point, the user client device 108 may utilize the image detail enhancement system 106 to generate refined edited images independently from the server device(s) 102.

In alternative embodiments, the image detail enhancement system 106 includes a web hosting application that allows the user client device 108 to interact with content and services hosted on the server device(s) 102. To illustrate, in one or more implementations, the user client device 108 accesses a web page supported by the server device(s) 102. The user client device 108 provides input to the server device(s) 102 to generate refined edited images, and, in response, the image detail enhancement system 106 on the server device(s) 102 performs operations. The server device (s) 102 then provides the output or results of the operations to the user client device 108.

Although the environment 100 includes a single user client device 108, in one or more embodiments, the environment 100 includes multiple user client devices and client devices. For example, the environment 100 include a first user client device associated with a user who creates (and views) an image. The environment 100 also optionally includes a second user client device associated with a user who views and edits the image.

Additionally, the user client device 108 optionally communicates directly with the image detail enhancement system 106, bypassing the network 112. Moreover, the image detail enhancement system 106 may access one or more databases housed on the server device(s) 102 or elsewhere in the environment 100. Further, the image detail enhancement system 106 optionally includes one or more machine learning models (e.g., neural networks), and the image detail enhancement system 106 is implemented in a variety of different ways across the server device(s) 102, the network 112, and the user client device 108.

While FIG. 1 illustrates an example environment in which the image detail enhancement system 106 operates, the following figures and corresponding discussion provide additional details regarding how the image detail enhancement system 106 improves details in edited images in accordance with one or more embodiments. For example, FIG. 2 provides an overview of the image detail enhancement system 106 generating a refined edited image in accordance with one or more embodiments.

Figure 2:
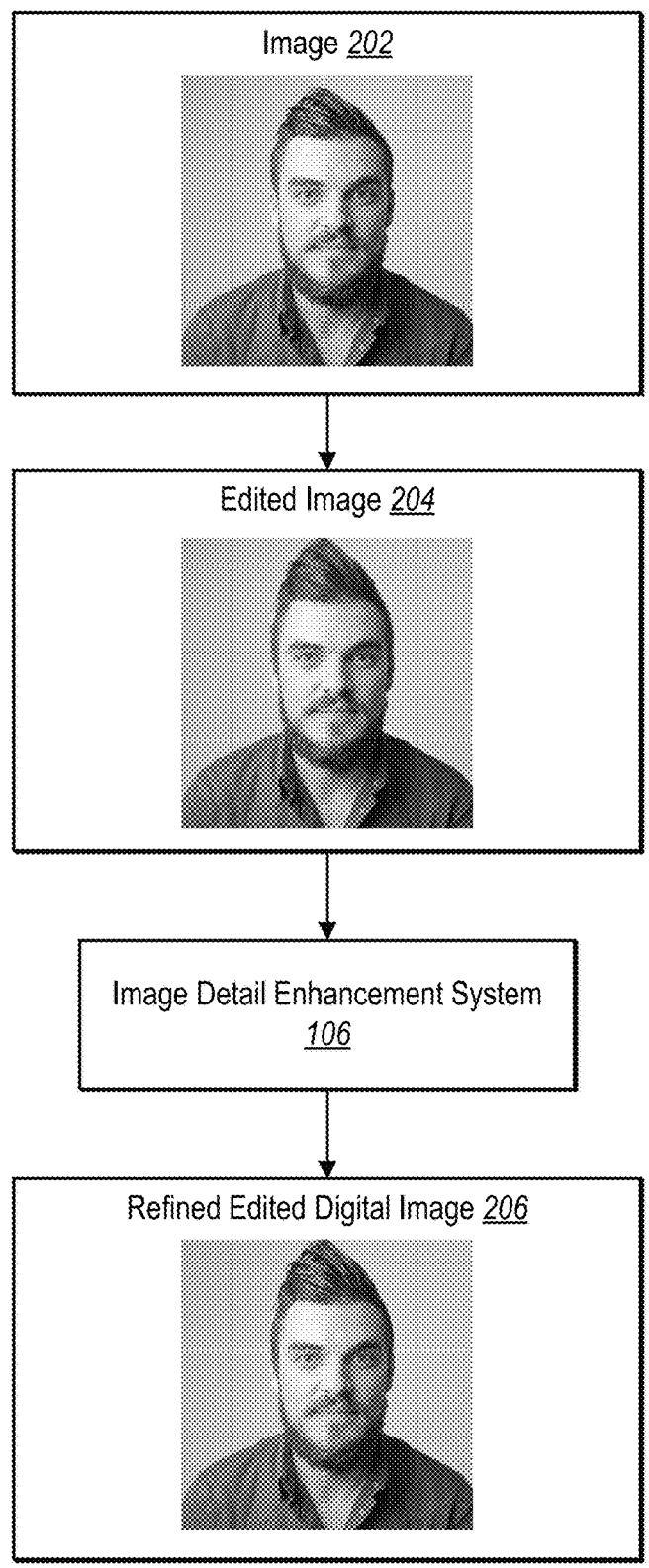
FIG. 2 illustrates an overview diagram of generating a refined edited digital image by refined a detailed area of an edited image in accordance with one or more embodiments of the present disclosure.

FIG. 2 illustrates an image 202. The image 202 portrays a face with one or more detailed segments. For example, the image 202 comprises a portrait with a detailed segment comprising hair. In some embodiments, the image 202 further includes a detailed segment including a facial wrinkles segment or a beard segment.

Figure 3:
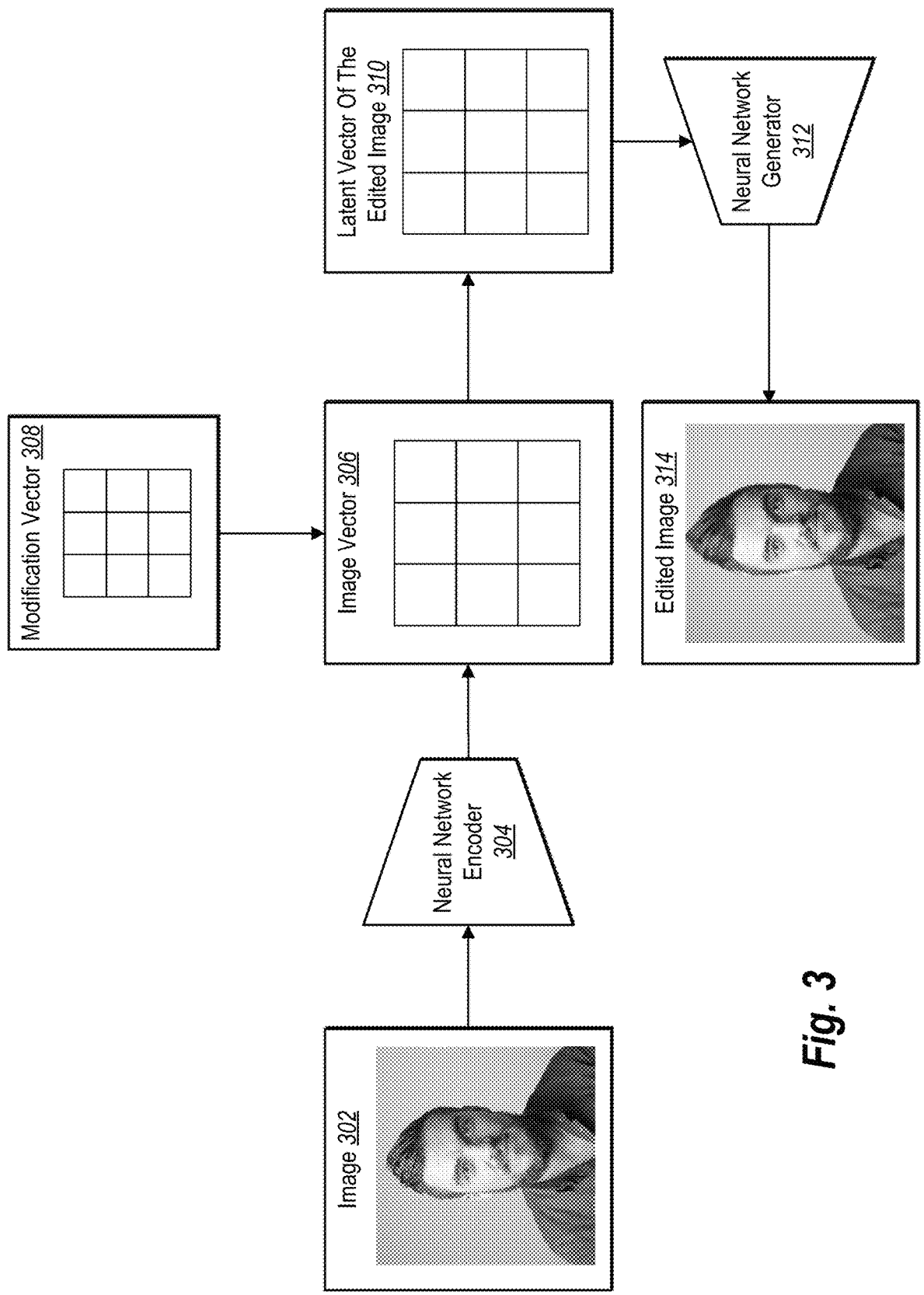
FIG. 3 illustrates an overview of generating an edited image by manipulating a latent code of an image in accordance with one or more embodiments of the present disclosure.

The image detail enhancement system 106 generates an edited image 204 based on an image 202. The image detail enhancement system 106 utilizes latent-code based editing to generate the edited image 204. As illustrated, the image detail enhancement system 106 generates the edited image 204 that has increased hair volume relative to the hair portrayed in the image 202. The image detail enhancement system 106 may generate edited images having different changes. For instance, in alternative implementations, the image detail enhancement system 106 changes the yaw or angle of the face in the image 202. In still further implementations, the image detail enhancement system 106 also modifies a volume of wrinkles or performs other edits. FIG. 3 and the corresponding paragraphs provide more detail regarding generating edited images in accordance with one or more embodiments.

Figure 4:
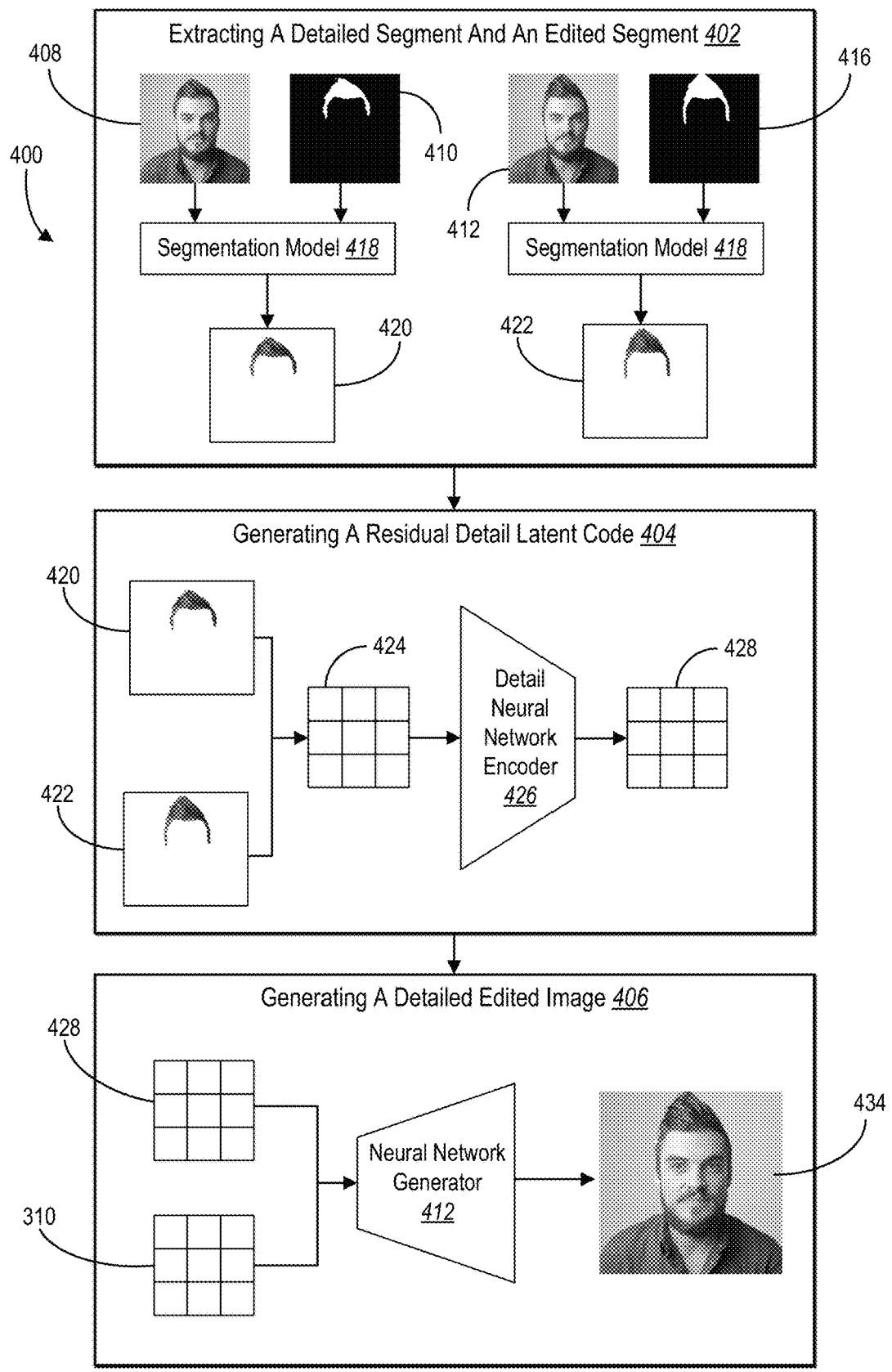
FIG. 4 illustrates an overview of generating a refined edited digital image utilizing a detail neural network encoder in accordance with one or more embodiments of the present disclosure.

As illustrated in FIG. 2, the edited image 204 demonstrates a loss of detail. For example, the high frequency details of hair in the image 202 are lessened or disappear after changing the hair volume or head pose as seen in the edited image 204. The image detail enhancement system 106 processes the edited image 204 to generate a refined edited digital image 206 based on a residual detail latent code. As shown, the image detail enhancement system 106 increases hair details in the refined edited digital image 206. FIG. 4 and the corresponding discussion provide additional detail regarding generating refined edited images in accordance with one or more embodiments.

As mentioned, in some embodiments, the image detail enhancement system 106 generates edited images based on images. FIG. 3 illustrates the image detail enhancement system 106 generating an edited image in accordance with one or more embodiments. In some embodiments, the image detail enhancement system 106 utilizes a generative adversarial network to create an edited image.

As illustrated in FIG. 3, the image detail enhancement system 106 utilizes a neural network encoder 304 of an image editing GAN to process an image 302. To further illustrate, the image editing GAN includes, but is not limited to, a generative adversarial neural network (GAN) that is trained on a dataset of facial images to generate facial images from latent vectors. In some embodiments, the image detail enhancement system 106 utilizes a generative neural network based on one or more neural network models such as, but not limited to, an unconditional GAN, a Deep Convolutional GAN (DCGAN), and/or a conditional GAN (cGAN). In addition to or as an alternative to a GAN, in some embodiments, the image detail enhancement system 106 can utilize recurrent neural networks (RNN) and/or convolutional neural networks (CNN) to generate digital images from latent vectors.

More specifically, the image detail enhancement system 106 utilizes the neural network encoder 304 to perform GAN inversion, which projects the image 302 into a latent space. For example, the image detail enhancement system 106 utilizes the neural network encoder 304 to project the image 302 into a latent vector or latent code 306 in the W+ latent space. The latent vector 306 represents characteristics of the image 302 in the vector space.

The image detail enhancement system 106 further performs latent-code based editing. Generally, the image detail enhancement system 106 edits the latent vector 306 using a modification vector 308. For example, by applying the modification vector 308, the image detail enhancement system 106 changes values or features within the latent vector 306. To illustrate, the modification vector 308 includes information to change the yaw or angle of the face, hair volume, number of wrinkles, and other characteristics of the face in the image 302. As illustrated in FIG. 3, the image detail enhancement system 106 modifies the latent vector 306 based on the modification vector 308 to create a latent vector of an edited image 310. In particular, the latent vector of the edited image 310 includes modifications relative to the latent vector 306 reflecting changes introduced by the modification vector 308.

As further illustrated in FIG. 3, the image detail enhancement system 106 may utilize a neural network generator 312 of the image editing GAN to generate the edited image 314. Generally, the neural network generator 312 converts the latent representation of the edited image 310, which in vector form, into the edited image 314. As mentioned previously, the edited image 314 shows a loss in some details such as in hair style and wrinkles. The following figures and paragraphs describe how the image detail enhancement system 106 enhances the details in the edited image 314 in accordance with one or more embodiments.

FIG. 4 provides an overview of the image detail enhancement system 106 generating a refined edited image that depicts edited images comprising refined edited segments with increased levels of details in accordance with one or more embodiments. In particular, FIG. 4 illustrates a series of acts 400 for generating a refined edited image. By way of overview, the series of acts 400 comprises an act 402 of extracting a detailed segment and an edited segment, an act 404 of generating a residual detail latent code, and an act 406 of generating a refined edited image.

FIG. 4 illustrates the act 402 of extracting a detailed segment and an edited segment. In one or more embodiments, the image detail enhancement system 106 utilizes the segmentation model 418 to segment (or identify) detailed segments and edited segments in images and edited images, respectively. The segmentation model 418 may comprise various segmentation models or tools for segmentation. As an example, the image detail enhancement system 106 utilizes neural network-based detailed segmentation models (e.g., U-Net, DenseNet, or convolutional neural networks) to segment portions of images including hair or wrinkles. Furthermore, in some embodiments, the image detail enhancement system 106 utilizes segmentation models comprising segmentation neural networks.

As illustrated in FIG. 4, the image detail enhancement system 106 utilizes the segmentation model 418 to generate a mask 410 from an image 408 and an edited mask 416 from an edited image 412. For example, the image detail enhancement system 106 utilizes a neural network trained to segment hair, such as that described by Wei et al. in Real-Time Hair Rendering using Sequential Adversarial Networks, Conference on Computer Vision, ECCV 2018, the contents of which are hereby incorporated by reference in their entirety or as described by Chai et al. in High-Quality Hair Modeling from a Single Portrait Photo, ACM Transactions on Graphics, October 2015, Article No.: 204, the contents of which are hereby incorporated by reference in their entirety. One will appreciate that the foregoing hair segmentation neural networks are provided as examples and other embodiments may utilize other segmentation neural networks.

As shown in FIG. 4, the image detail enhancement system 106 utilizes the mask 410 and the image 408 to generate a detailed segment 420. The detailed segment 420 comprises region of the image 408 that contains detail as indicated by the mask 410. As shown, the detailed segment 420 includes high-frequency details in hair. Similarly, the image detail enhancement system 106 utilizes the edited mask 416 and the edited image 412 to generate an edited segment 422. The edited segment 422 corresponds to the detailed segment 420. For instance, the edited segment 422 includes hair corresponding to the hair in the detailed segment 420. As further shown, the edited segment 422 is not as detailed as the detailed segment 420.

The series of acts 400 further includes the act 404 of generating a residual detail latent code. Generally, the image detail enhancement system 106 generates a combination 424 of the detailed segment 420 and the edited segment 422. For example, the image detail enhancement system 106 concatenates the detailed segment 420 and the edited segment 422. In some embodiments, the image detail enhancement system 106 resizes image matrices corresponding with the detailed segment 420 and the edited segment 422 in case the detailed segment 420 and the edited segment 422 have different dimensions. The image detail enhancement system 106 further combines an image matrix for the detailed segment 420 and an image matrix for the edited segment 422.

The image detail enhancement system 106 further utilizes a detail neural network encoder 426 to generate a residual detail latent code 428 based on the combination of the detailed and edited segments 424. Taking the combination of the detailed and edited segments 424 as input, the detail neural network encoder 426 predicts the residual detail latent code 428. The residual detail latent code 428 comprises a latent vector in a latent space. More specifically, the residual detail latent code 428 contains information of details in the detailed segment 420 and the edited segment 422. For example, the residual detail latent code 428, in one or more embodiments, encodes in a latent space, a difference or residual between the detailed segment 420 and the edited segment 422.

The series of acts 400 illustrated in FIG. 4 further includes the act 406 of generating a refined edited image. Generally, the image detail enhancement system 106 generates a refined edited image 434 that depicts the edited image 412 with an increased level of detail. The image detail enhancement system 106 does so by synthesizing the residual detail latent code 428 and the latent vector of the edited image 310 utilizing the neural network generator 312.

Figure 5:
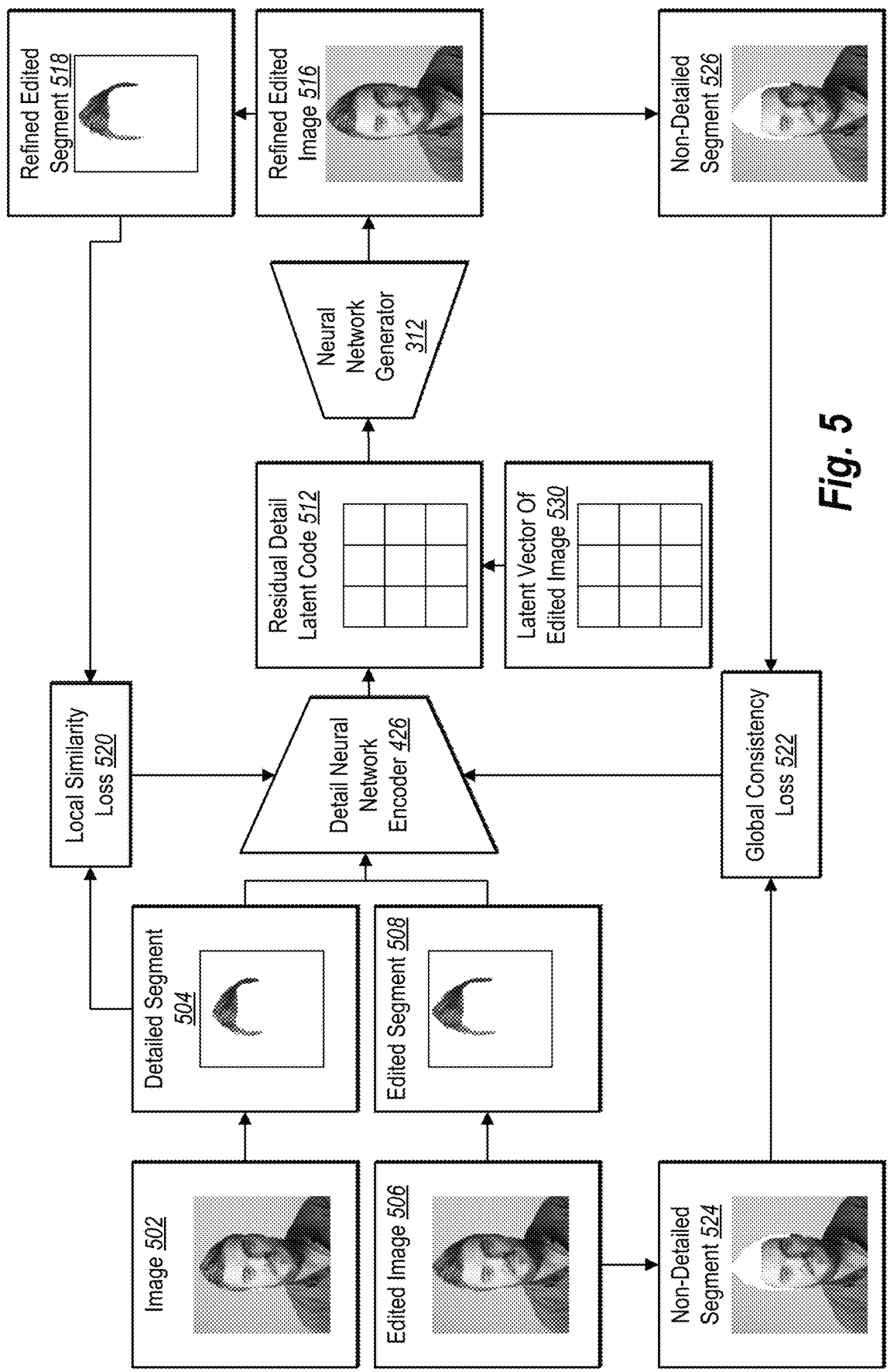
FIG. 5 illustrates learning parameters of a detail neural network encoder in accordance with one or more embodiments of the present disclosure.

As previously mentioned, the image detail enhancement system 106 learns parameters of a detail neural network encoder. FIG. 5 illustrates the image detail enhancement system 106 training the detail neural network encoder in accordance with one or more embodiments. The image detail enhancement system 106 generates a refined edited image 516 based on an image 502 and an edited image 506. As shown in FIG. 5, the image detail enhancement system 106 utilizes a detail neural network encoder 426 to project a combination of a detailed segment 504 from the image 502 and an edited segment 508 from the edited image 506 into a residual detail latent code 512. The image detail enhancement system 106 utilizes the GAN neural network generator 312 to generate the refined edited image 516.

The image detail enhancement system 106 modifies parameters of the detail neural network encoder 426 based on a total loss. In some embodiments, the total loss comprises two types of losses: a global consistency loss and a local similarity loss. Generally, the image detail enhancement system 106 generates a global consistency loss 522 to constrain differences between a non-detailed segment 524 of the edited image 506 and a non-detailed segment 526 of the refined edited image 516. In the example illustrated in FIG. 5, ideally, only the region with hair is changed and improved while the remaining portions of the edited image 506 remain similar or the same. In some embodiments, the image detail enhancement system 106 defines the global consistency loss ($L_{global}$) as $$L_{global} = \alpha_1 L_{LPIPS}(y \cdot (1-\hat{m}) \hat{y}_{t+1} \cdot (1-\hat{m}) + \alpha_2 L_2(y \cdot (1-\hat{m}) \hat{y}_{t+1} \cdot (1-\hat{m}))$$

Where $L_{LPIPS}$ is a Learned Perceptual Image Patch Similarity (LPIPS) loss, $L_2$ is the mean square loss, $\hat{m}$ is the edited mask, $y \cdot (1-\hat{m})$ is a non-detailed segment 524 of the edited image 506, and $\hat{y}_{t+1} \cdot (1-\hat{m})$ is a non-detailed segment 526 of the refined edited image 516. The image detail enhancement system 106 utilizes the global consistency loss 522 to modify parameters of the detail neural network encoder 426 to reduce differences between the non-detailed segment 524 of the edited image 506 and the non-detailed segment 526 of the refined edited image 516.

The image detail enhancement system 106 further generates a local similarity loss 520 to ensure that details in a refined edited segment 518 of the refined edited image 516 are as close as possible to details in the detailed segment 504 of the image 502. In some embodiments, the image detail enhancement system 106 defines the local similarity loss ($L_{local}$) as $$L_{local} = \frac{1}{N} \sum_{i=1}^{N} [\beta_1 L_{LPIPS}(p_i, \hat{p}_i) + \beta_2 L_{style}(p_i, \hat{p}_i) + \beta_3 L_{adv}(p_i, \hat{p}_i)]$$

Where N is the number of patches, $p_i$ is a patch from the detailed segment 504 of the image 502, $\hat{p}_i$ is a refined patch from the refined edited segment 518 of the refined edited image 516, $L_{style}$ is the style loss, and $L_{adv}$ is the adversarial loss using a discriminator.

In some embodiments, sampling patches from the refined edited image 516 and the image 502 is problematic because detailed areas in the image 502 and the refined edited image 516 are not aligned. The image detail enhancement system 106 may sample the refined patch $\hat{p}_i$ and the patch $p_i$ from the same pixel locations in the image 502 and the refined edited image 516. Alternatively, the image detail enhancement system 106 samples the refined patch $\hat{p}_i$ in a neighborhood area of a sample pixel location in the image 502.

To illustrate, in one or more embodiments, the image detail enhancement system 106 randomly samples a patch $p_i$ at a sample location in the detailed segment 504 of the image 502. The patch $p_i$ has a predetermined size (e.g., 128×128 pixels). The image detail enhancement system 106 samples a refined patch $\hat{p}_i$ from the refined edited image 516 at a location corresponding to the sample location. For instance, the location and the sample location have the same pixel coordinates. The image detail enhancement system 106 determines whether the location is within the refined edited segment 518. In some embodiments, the image detail enhancement system 106 determines that the location is within an area of an edited mask (e.g., the edited mask 416). If the location is not within the refined edited segment 518, the image detail enhancement system 106 randomly selects a second location in a neighborhood area of the sample location in the refined edited image 516. Again, the image detail enhancement system 106 determines whether the second location is within an area of the edited mask. If not, the image detail enhancement system 106 continues sampling random locations in a neighborhood area of the sample location until the image detail enhancement system 106 identifies a suitable refined patch $\hat{p}_i$.

In some embodiments, the image detail enhancement system 106 determines the total loss (L) using the following function $$L = L_{global} + L_{local}$$

Furthermore, in some embodiments, the image detail enhancement system 106 iteratively updates parameters of the detail neural network encoder 426. To illustrate, the image detail enhancement system 106 performs a forward pass to generate the refined edited image 516. The image detail enhancement system 106 samples N number of patches and refined patches from the image 502 and the refined edited image 516, respectively. The image detail enhancement system 106 computes a total loss (L) according to the function described above. The image detail enhancement system 106 further back-propagates the gradients and updates the parameters of the detail neural network encoder 426. The image detail enhancement system 106 repeats the above-mentioned steps until the number of training iterations equals a number of total training iterations or the total loss converges to a predetermined threshold. In some embodiments, the image detail enhancement system 106 determines the number of total training iterations based on user input. For instance, a user may specify three to five training iterations. In some embodiments, the image detail enhancement system 106 keeps the coarse structure in the refined edited image 516 unchanged relative to the image 502. To do so, the image detail enhancement system 106 sets the first ten style codes of the residual detail latent code 512 to zeros. Thus, only the remaining eight codes of the residual detail latent code 512 are updated during training.

As described above, the detail neural network encoder 426, in one or more embodiments, comprises the architecture of the ReStyle encoder albeit modified to accept an input of a combination of a detailed segment 504 and an edited segment 508. Furthermore, the detail neural network encoder 426 has parameters learned as described above in relation to FIG. 5. In one or more embodiments, during the learning of the parameters of the detail neural network encoder 426, the parameters of the neural network generator 312 are locked. In such embodiments, the image detail enhancement system 106 utilizes a pretrained neural network generator 312.

Figure 6:
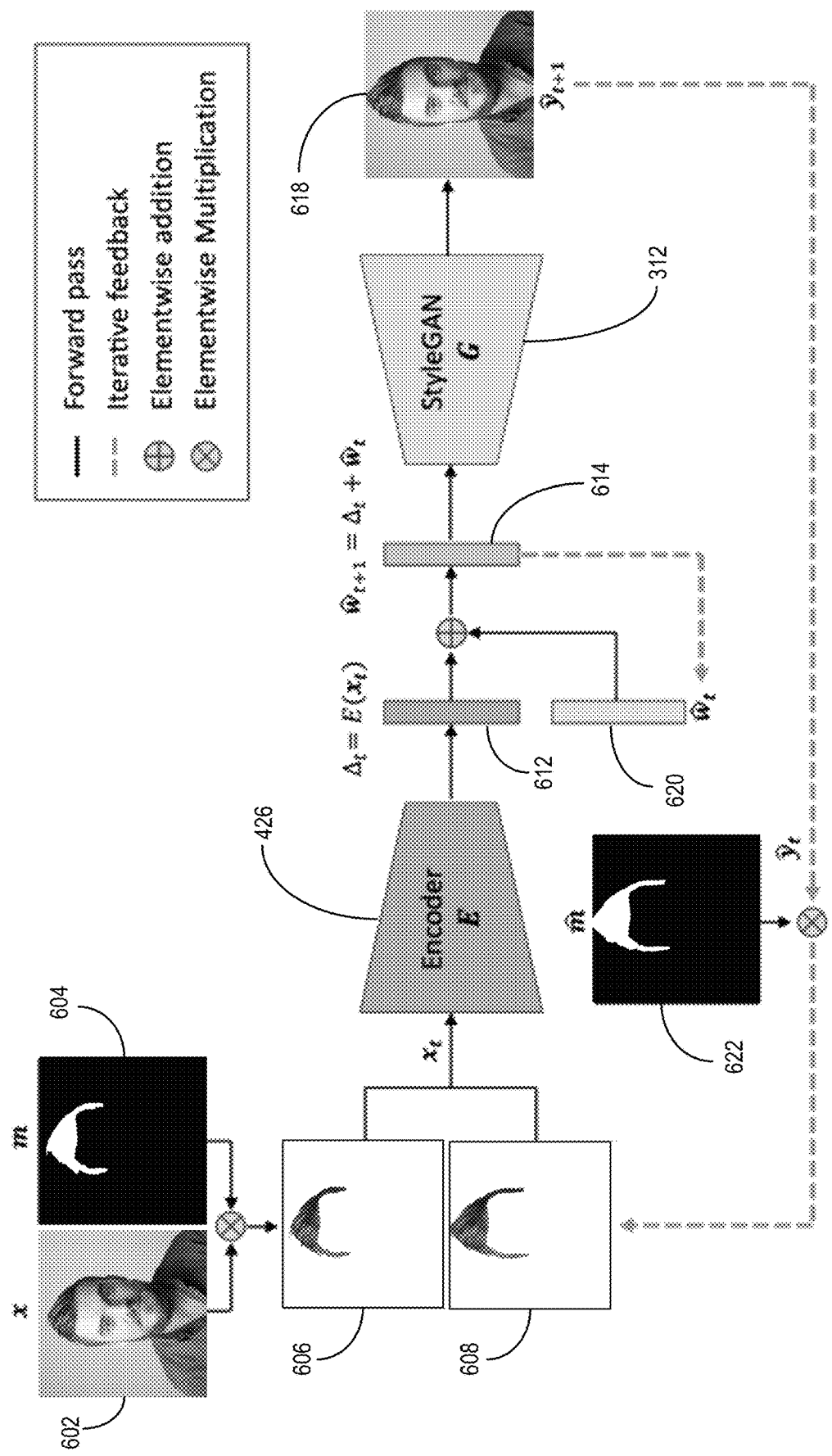
FIG. 6 illustrates utilizing a detail neural network encoder iteratively to generate a refined edited digital image in accordance with one or more embodiments of the present disclosure.

As mentioned previously, in some embodiments, the image detail enhancement system 106 iteratively refines a detailed edited segment during inference. FIG. 6 illustrates the image detail enhancement system 106 iteratively refines the detailed edited segment during application in accordance with one or more embodiments. The image detail enhancement system 106 generates a detailed segment for an image 602 based on a mask 604. In a first iteration, the image detail enhancement system 106 concatenates a detailed segment 606 and an edited segment 608 to generate an input ($x_t$) for the detail neural network encoder 426. The detail neural network encoder 426 projects the input ($x_t$) into a residual detail latent code 612 expressed as $\Delta t = E(x_t)$. The image detail enhancement system 106 combines the residual detail latent code 612 ($\Delta_t$) with a latent vector or representation 620 ($\hat{w}_t$) of the refined edited image from a first iteration to generate a latent vector of an updated refined edited image 614 ($\hat{w}_{t+1}$). The image detail enhancement system 106 further utilizes a neural network generator 312 to generate an updated refined edited image 618 based on the latent vector of the updated refined edited image 614. The updated refined edited image 614 will generally include more detail in the edited segment 608 than the refined edited image from the first iteration.

Generally, the image detail enhancement system 106 iteratively enhances the refined edited segment of the refined edited image 618 based on the refined edited image 618 and the latent vector of the refined edited image 614. To illustrate, in a third iteration, the image detail enhancement system 106 utilizes a segmentation model to generate a refined edited mask 622 for the refined edited image 618. The image detail enhancement system 106 combines the refined edited segment and the detailed segment 606. The image detail enhancement system 106 further utilizes the detail neural network encoder 426 to project this combination into a combined refined latent vector. The image detail enhancement system 106 further synthesizes the combined refined latent vector and the latent representation of the refined edited image 618 utilizing the neural network generator 312. Accordingly, the image detail enhancement system 106 increases similarities between the detailed segment and the refined detailed segment with each iteration. The image detail enhancement system 106 may define the number of total iterations. For instance, the image detail enhancement system 106 completes the iteration process after two, three, five, etc. total iterations.

Inference of the detail neural network encoder 426 is fast relative to conventional systems. In particular, inference by the detail neural network encoder 426 takes about 0.3 seconds on an NVIDIA V100 GPU. Accordingly, utilization of the detail neural network encoder 426 does not add much time once the image detail enhancement system 106 has trained the detail neural network encoder 426. Thus, the image detail enhancement system 106 quickly refines edited images in essentially real-time (little or no latency).

Figure 7:
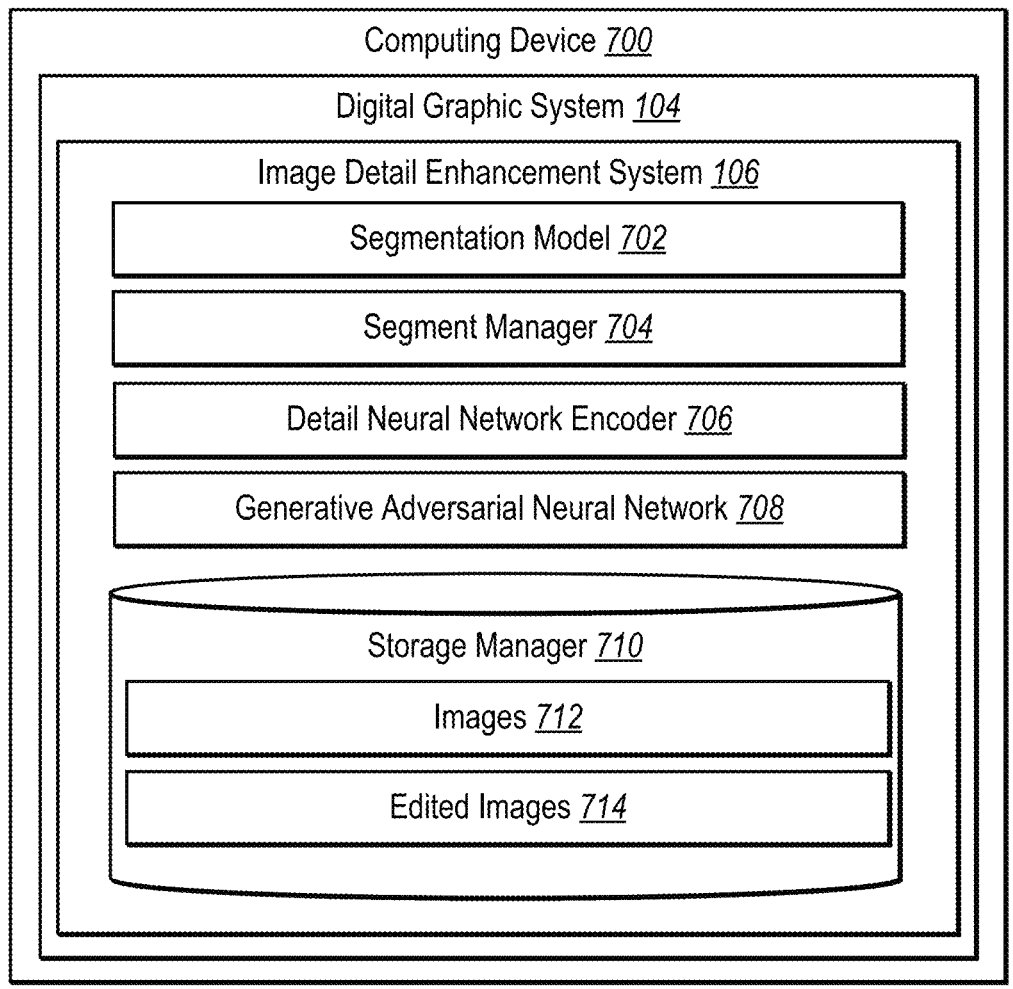
FIG. 7 illustrates a schematic diagram of an example architecture of the image detail enhancement system in accordance with one or more embodiments of the present disclosure.

FIG. 7 provides additional detail regarding various components and capabilities of the image detail enhancement system 106 in accordance with one or more embodiments. Generally, FIG. 7 illustrates the image detail enhancement system 106 implemented by the digital graphic system 104 on a computing device 700 (e.g., the user client device 108 and/or the server device(s) 102). As shown, the image detail enhancement system 106 includes, but is not limited to, a segmentation model 702, a segment manager 704, a detail neural network encoder 426, a generative adversarial neural network 708 (which comprises the neural network generator 312), and a storage manager 710. As shown, the storage manager 710 stores images 712 and edited images 714.

The image detail enhancement system 106 illustrated in FIG. 7 includes the segmentation model 702. The segmentation model 702 comprises a pretrained segmentation network that extracts detailed segments, edited segments, and refined edited segments from images, edited images, and refined edited images, respectively. The segment manager 704 stores and manages the detailed segments, edited segments, and refined edited segments. The segment manager 704 further combines segments to generate detailed edited segments. The detail neural network encoder 426 projects detailed edited segments into detailed edited latent vectors. The generative adversarial neural network 708 generates refined edited images by synthesizing a detailed edited latent vector and a latent representation of the edited image. The storage manager 710 stores the images 712 and the edited images 714. The images 712 comprise digital images uploaded or imported by a user. The edited images 714 comprise edited images that generated by a GAN. In some embodiments, the storage manager 710 further stores refined edited images.

In some embodiments, the image detail enhancement system 106 is implemented as part of the digital graphic system 104 in a distributed system of the server devices for generating refined edited images. Additionally, or alternatively, the image detail enhancement system 106 is implemented on a single computing device such as the server device(s) 102 or the user client device 108 of FIG. 1.

In one or more embodiments, each of the components of image detail enhancement system 106 are in communication with one another using any suitable communication technologies. Additionally, the components of the image detail enhancement system 106 are in communication with one or more other devices including the user client device 108 illustrated in FIG. 1. Although the components of the image detail enhancement system 106 are shown as separate in FIG. 7, any of the subcomponents may be combined into fewer components, such as into a single component or divided into more components as may serve a particular implementation. Furthermore, although the components of FIG. 7 are described in connection with the image detail enhancement system 106, at least some components for performing operations in conjunction with the image detail enhancement system 106 described herein may be implemented on other devices within the environment.

The components of the image detail enhancement system 106 can include software, hardware, or both. For example, the components of the image detail enhancement system 106 can include one or more instructions stored on a computer-readable storage medium and executable by processors of one or more computing devices (e.g., the user client device 108). When executed by the one or more processors, the computer-executable instructions of the image detail enhancement system 106 can cause the computing devices to perform the refined edited image generation methods described herein. Alternatively, the components of the image detail enhancement system 106 can comprise hardware, such as a special purpose processing device to perform a certain function or group of functions. Additionally, or alternatively, the components of the image detail enhancement system 106 can include a combination of computer-executable instructions and hardware.

Furthermore, the components of the image detail enhancement system 106 performing the functions described herein with respect to the image detail enhancement system 106 may, for example, be implemented as part of a stand-alone application, as a module of an application, as a plug-in for applications, as a library function or functions that may be called by other applications, and/or as a cloud-computing model. Thus, the components of the image detail enhancement system 106 may be implemented as part of a stand-alone application on a personal computing device or a mobile device. Alternatively, or additionally, the components of the image detail enhancement system 106 may be implemented in any application that provides image management, including, but not limited to ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are registered trademarks of Adobe Inc in the United States and/or other countries.

Figure 8:
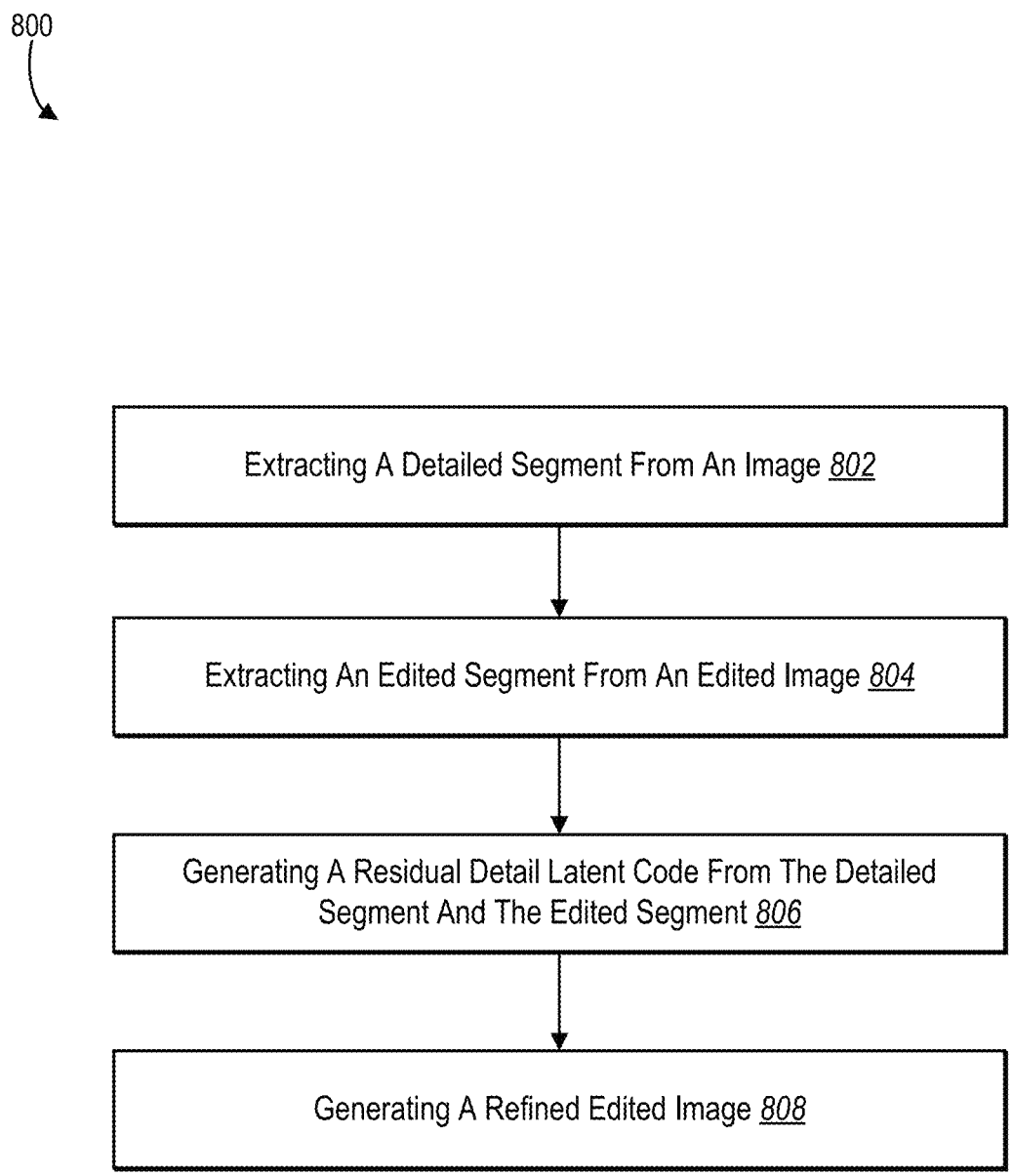
FIG. 8 illustrates a series of acts for generating a refined edited image in accordance with one or more embodiments of the present disclosure.

FIGS. 1-7, the corresponding text, and the examples provide a number of different methods, systems, devices, and non-transitory computer-readable media of the image detail enhancement system 106. In addition to the foregoing, one or more embodiments can also be described in terms of flowcharts comprising acts for accomplishing the particular result, as shown in FIG. 8. The series of acts illustrated in FIG. 8 may be performed with more or fewer acts. Further, the illustrated acts may be performed in different orders. Additionally, the acts described herein may be repeated or performed in parallel with one another or in parallel with different instances of the same or similar acts.

FIG. 8 illustrates a flowchart of a series of acts 800 for generating a refined edited image in accordance with one or more embodiments. The series of acts 800 includes an act 802 of extracting a detailed segment from an image. In particular, the act 802 comprises segmenting a portion of the image comprising high frequency details utilizing a segmentation model (e.g., a segmentation neural network). In some embodiments, act 802 comprises extracting a portion of the image comprising hair or facial wrinkles.

The series of acts 800 illustrated in FIG. 8 further includes an act 804 of extracting an edited segment from an image. In particular, the act 804 comprises segmenting a portion of the edited image corresponding to the detailed segment utilizing a segmentation model (e.g., a segmentation neural network). In some embodiments, act 804 comprises extracting a portion of the edited image comprising hair or facial wrinkles. In one or more embodiments, the edited image comprises a version of the image that has been edited utilizing latent-code based editing and reconstruction utilizing a neural network generator.

FIG. 8 further includes an act 806 of generating a residual detail latent code from the detailed segment and the edited segment. For example, act 806 involves projecting the detailed segment and the edited segment into a latent space utilizing a detail neural network encoder.

FIG. 8 further includes an act 808 of generating a refined edited image. In particular, the act 808 comprises generating a refined edited image that depicts the edited image comprising a refined edited segment with an increased level of detail by synthesizing the residual detail latent code and a latent code of the edited image utilizing the neural network generator.

Additionally, the series of acts 800 may include an additional act of iteratively refining the detailed edited segment. More specifically, in one or more examples, iteratively refining the refined edited segment of the refined edited image comprises utilizing updated residual detail latent codes generated from previous iterations of the detailed edited segment. In one or more embodiments, iteratively refining the refined edited segment of the refined edited image comprises combining the refined edited segment and the detailed segment of the image, projecting the combined refined edited segment and the detailed segment into an updated residual detail latent code utilizing the detail neural network encoder, and updating the refined edited image by synthesizing the updated residual detail latent code and the latent vector of the refined edited image utilizing the neural network generator.

In some embodiments, the series of acts 800 includes additional acts of generating a total loss based on the refined edited image, the edited image, and the image, and modifying parameters of the detail neural network encoder based on the total loss. In some embodiments, generating the total loss comprises generating a global consistency loss to constrain differences between a non-detailed segment from the edited image and a non-detailed segment from the refined edited image; and generating a local similarity loss to constrain differences between the detailed segment from the image and the refined edited segment from the refined edited image. Furthermore, in some embodiments, generating the local similarity loss comprises sampling a patch at a location in the detailed segment from the image; sampling a refined patch at a corresponding location of the refined edited segment from the refined edited image; and comparing the patch and the refined patch. In one or more embodiments, the corresponding location comprises a neighborhood area of the location in the refined edited segment.

In addition (or in the alternative to) the acts described above, in some embodiments, the series of acts 800 includes a step for refining the edited image based on the detailed segment and the edited detailed segment. For example, the acts described in reference to FIGS. 4 and 6 can comprise the corresponding acts (or structure) for performing a step for refining the edited image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
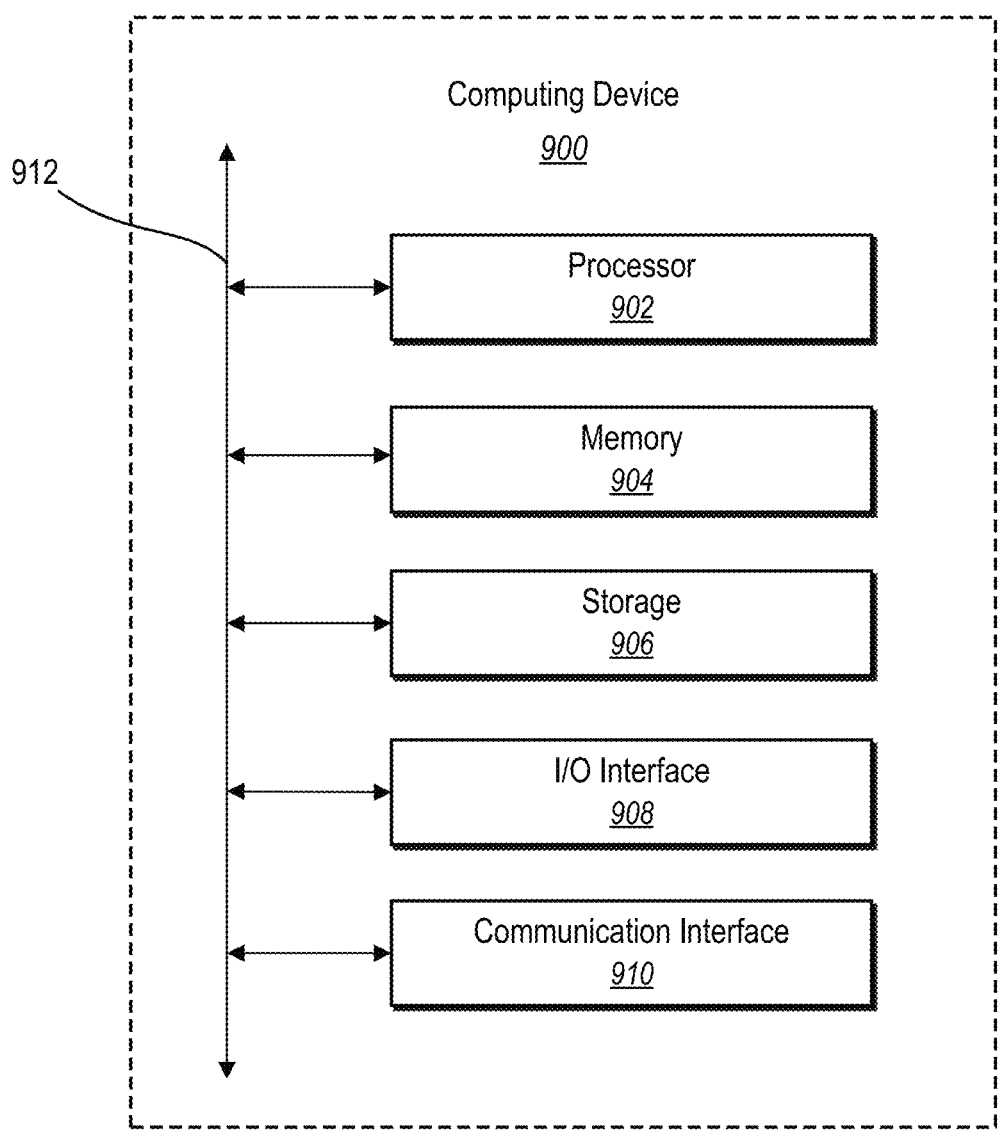
FIG. 9 illustrates a block diagram of an example computing device in accordance with one or more embodiments of the present disclosure.

FIG. 9 illustrates a block diagram of a computing device 900 that may be configured to perform one or more of the processes described above. One will appreciate that one or more computing devices such as the computing device 900 may implement the image detail enhancement system 106 and the digital graphic system 104. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The invention claimed is:

1. A system comprising:
  a storage device storing an image and an edited image generated from the image;
  one or more memory devices comprising a detail neural network encoder and a neural network generator; and
  at least one processor configured to cause the system to:
    extract a detailed segment from the image;
    extract an edited segment from the edited image, wherein the edited segment comprises an edited version of the detailed segment;
    generate a residual detail latent code by projecting the detailed segment and the edited segment into a latent space utilizing the detail neural network encoder; and generate a refined edited image that depicts the edited image comprising a refined edited segment with an increased level of detail by synthesizing the residual detail latent code and a latent vector of the edited image utilizing the neural network generator.

2. The system as recited in claim 1, wherein the at least one processor is configured to cause the system to extract the detailed segment from the image and the edited segment from the edited image utilizing a segmentation neural network.

3. The system as recited in claim 1, wherein the at least one processor is configured to cause the system to iteratively refine the edited image utilizing updated residual detail latent codes generated from previous iterations of the refined edited segment.

4. The system as recited in claim 3, wherein the at least one processor is configured to cause the system to iteratively refine the refined edited segment of the refined edited image by:
  combining the refined edited segment and the detailed segment of the image;
  projecting the combined refined edited segment and the detailed segment into an updated residual detail latent code utilizing the detail neural network encoder; and
  updating the refined edited image by synthesizing the updated residual detail latent code and the latent vector of the refined edited image utilizing the neural network generator.

5. The system as recited in claim 1, wherein the at least one processor is configured to cause the system to extract the detailed segment from the image by segmenting a portion of the image comprising at least one of a hair or facial wrinkles.

6. The system as recited in claim 1, wherein the at least one processor is configured to cause the system to:
  generate a total loss based on the refined edited image, the edited image, and the image; and
  modify parameters of the detail neural network encoder based on the total loss.

7. The system as recited in claim 6, wherein the at least one processor is configured to cause the system to generate the total loss by:
  generating a global consistency loss to constrain differences between a non-detailed segment from the edited image and a non-detailed segment from the refined edited image; and
  generating a local similarity loss to constrain differences between the detailed segment from the image and the refined edited segment from the refined edited image.

8. The system as recited in claim 7, wherein the at least one processor is configured to cause the system to generate the local similarity loss by:
  sampling a patch at a location in the detailed segment from the image;
  sampling a refined patch at a corresponding location of the refined edited segment from the refined edited image; and
  comparing the patch and the refined patch.

9. The system as recited in claim 8, wherein sampling the refined patch at the corresponding location comprises sampling the refined patch from a neighborhood area of the location in the refined edited segment.

10. A non-transitory computer readable medium storing instructions thereon that, when executed by at least one processor, cause the at least one processor to perform operations comprising:
  combining a detailed segment from an image with an edited segment from an edited image, wherein the edited image is generated from the image, and wherein the edited segment comprises an edited version of the detailed segment;
  projecting the combined detailed segment and edited segment into a residual detail latent code utilizing a detail neural network encoder;
  generating a refined edited image that depicts the edited image comprising a refined edited segment with an increased level of detail by synthesizing the residual detail latent code and a latent vector of the edited image utilizing a neural network generator; and
  iteratively refining the refined edited segment of the refined edited image.

11. The non-transitory computer readable medium recited in claim 10, wherein iteratively refining the refined edited segment of the refined edited image comprises:
  combining the refined edited segment and the detailed segment of the image;
  projecting the combination of the refined edited segment and the detailed segment of the image into an updated residual detail latent code utilizing the detail neural network encoder; and
  updating the refined edited image by synthesizing the updated residual detail latent code and a latent vector of the edited image utilizing the neural network generator.

12. The non-transitory computer readable medium recited in claim 10, further comprising instructions that, when executed by the at least one processor, cause the at least one processor to perform operations comprising extracting the detailed segment from the image by segmenting a portion of the image comprising hair.

13. The non-transitory computer readable medium recited in claim 10, further comprising instructions that, when executed by the at least one processor, cause the at least one processor to perform operations comprising:
  generating a total loss based on the refined edited image, the edited image, and the image; and
  modifying parameters of the detail neural network encoder based on the total loss.

14. The non-transitory computer readable medium recited in claim 13, wherein generating the total loss comprises:
  generating a global consistency loss to constrain differences between a non-detailed segment from the edited image and a non-detailed segment from the refined edited image; and
  generating a local similarity loss to constrain differences between the detailed segment from the image and the refined edited segment from the refined edited image.

15. The non-transitory computer readable medium recited in claim 13, further comprising instructions that, when executed by the at least one processor, cause the at least one processor to fix the parameters of the neural network generator when modifying parameters of the detail neural network encoder based on the total loss.

16. The non-transitory computer readable medium recited in claim 10, further comprising instructions that, when executed by the at least one processor, cause the at least one processor to perform operations comprising extracting the detailed segment from the image and the edited segment from the edited image by utilizing a segmentation model.

17. The non-transitory computer readable medium recited in claim 10, further comprising instructions that, when executed by the at least one processor, cause the at least one processor to perform operations comprising generating the edited image from the image utilizing latent-code based editing.

18. A method of generating a refined edited image comprising:
- extracting a detailed segment from an image and an edited detailed segment from an edited image, wherein the edited image is generated from the image, and wherein the edited detailed segment comprises an edited version of the detailed segment;
- performing a step for refining the edited image based on the detailed segment and the edited detailed segment; and
- providing the refined edited image for display.

19. The method recited in claim 18, further comprising:
- projecting the image into a latent space to generate a latent vector for the image;
- modifying the latent vector of the image; and
- generating the edited image by reconstructing the modified latent vector utilizing a neural network generator.

20. The method recited in claim 18, wherein the step for refining the edited image comprises iteratively refining the edited image.

* * * * *